United States Patent [19]
Trimberger

[11] Patent Number: 6,023,564
[45] Date of Patent: Feb. 8, 2000

[54] DATA PROCESSING SYSTEM USING A FLASH RECONFIGURABLE LOGIC DEVICE AS A DYNAMIC EXECUTION UNIT FOR A SEQUENCE OF INSTRUCTIONS

[75] Inventor: Stephen M. Trimberger, San Jose, Calif.

[73] Assignee: Xilinx, Inc., San Jose, Calif.

[21] Appl. No.: 08/686,620

[22] Filed: Jul. 19, 1996

[51] Int. Cl.[7] .................................................. G06F 19/00
[52] U.S. Cl. .......................... 395/500; 395/571; 395/387
[58] Field of Search .................... 395/500, 571, 395/387, 384; 364/488, 489, 490, 491; 340/825.83

[56] References Cited

U.S. PATENT DOCUMENTS

| | | | |
|---|---|---|---|
| 4,812,989 | 3/1989 | Maier et al. | 395/387 |
| 5,101,483 | 3/1992 | Tanagawa | 395/384 |
| 5,105,421 | 4/1992 | Gingell | 370/363 |
| 5,129,079 | 7/1992 | Miyashita | 395/387 |
| 5,333,287 | 7/1994 | Buerkle et al. | 395/387 |
| 5,412,785 | 5/1995 | Shruhak et al. | 395/571 |
| 5,684,980 | 11/1997 | Casselman | 395/500 |

OTHER PUBLICATIONS

Gokhale et al. (Building and using a highly parallel programmable logic array) IEEE, Jan. 1991.

"The Programmable Logic Data Book", 1994, available from Xilinx, Inc., 2100 Logic Drive, San Jose, California 95124.

Primary Examiner—Thomas C. Lee
Assistant Examiner—Gautam R. Patel
Attorney, Agent, or Firm—Mark A. Haynes; Crosby, Heafey, Roach & May; Jeanette S. Harms

[57] ABSTRACT

A flash reconfigurable programmable logic device is applied as a dynamic execution unit for a sequence of instructions. The sequence of instructions includes control portion, and a portion which indicates which configuration of the flash configurable programmable logic device is to be used with that instruction. In each execution cycle, a configuration is selected in accordance with the instruction being executed, switching from one configuration of the programmable logic device to any other configuration stored on the device in a single cycle. The configuration store stores a set of configuration words defining respective logic functions of the configurable logic elements in the programmable logic device. The configuration select circuits operate to apply a selected configuration word from the set of configuration words to configure the configurable logic elements. An instruction store stores a sequence of instructions for execution by the programmable logic device. Sequencing logic is coupled to the instruction store and configuration select circuits on the programmable logic device. The sequencing logic controls the configuration select circuits to apply configuration words from the set of configuration words during respective execution cycles, in response to the sequence of instructions.

29 Claims, 4 Drawing Sheets

DATA PROCESSING SYSTEM USING A FLASH RECONFIGURABLE LOGIC DEVICE AS A DYNAMIC EXECUTION UNIT FOR A SEQUENCE OF INSTRUCTIONS

BACKGROUND OF THE INVENTION

1. Field of the Invention

The present invention relates to data processing systems which rely on programmable logic devices for execution of a sequence of instructions. In particular, the present invention applies to programmable logic devices which store a plurality of configuration words, and execute instructions which include a control field for selecting one of the plurality of configuration words for use in a current execution cycle.

2. Description of Related Art

Programmable logic devices such as field programmable gate arrays ("FPGAs") are a well known type of integrated circuit and are of wide applicability due to the flexibility provided by their reprogrammable nature. An FPGA typically includes an array of configurable logic blocks (CLBs) that are programmably interconnected to each other to provide logic functions desired by a user (a circuit designer). An FPGA typically includes a regular array of identical CLBs, wherein each CLB is individually programmed to perform any one of a number of different logic functions. The FPGA has a configurable routing structure for interconnecting the CLBs according to the desired user circuit design. The FPGA also includes a number of configuration memory cells which are coupled to the CLBs to specify the function to be performed by each CLB, as well as to the configurable routing structure to specify the coupling of the input and output lines of each CLB. The FPGA may also include data storage memory cells accessible by a user during operation of the FPGA. The Xilinx, Inc. 1994 publication entitled "The Programmable Logic Data Book" describes several FPGA products and other programmable logic devices and is herein incorporated by reference in its entirety.

One approach available in the prior art to increase the complexity and size of logic circuits has been coupling multiple FPGAs (i.e. multiple chips) by external connections. However, due to the limited number of input/output connections, i.e. pins, between the FPGAs, not all circuits can be implemented using this approach. Moreover, using more than one FPGA undesirably increases power consumption, cost, and space to implement the user circuit design.

Another known solution has been increasing the number of CLBs and interconnect structures in the FPGA. However, for any given semiconductor fabrication technology, there are limitations to the number of CLBs that can be fabricated on an integrated circuit chip of practical size. Thus, there continues to be a need to increase the number of logic gates or CLB densities for FPGAs.

Reconfiguring an FPGA to perform different logic functions at different times is known in the art. However, this reconfiguration requires the time consuming step of reloading a configuration bit stream for each reconfiguration. Moreover, reconfiguration of a prior art FPGA generally requires suspending the implementation of the logic functions, saving the current state of the logic functions in a memory device external to the FPGA, reloading the entire array of memory configurations cells, and inputting the states of the logic functions which have been saved off chip along with any other needed inputs. Each of these steps requires a significant amount of time, thereby rendering reconfiguration impractical for implementing typical circuits.

Thus, as described in our co-pending U.S. patent application entitled TIME MULTIPLEXED PROGRAMMABLE LOGIC DEVICE, invented by Stephen M. Trimberger, Richard A. Carberry, Robert Anders Johnson, and Jennifer Wong, filed Aug. 18, 1995, having application Ser. No. 08/516,186, now U.S. Pat. No. 5,646,545, programmable logic devices have been developed in which a plurality of configuration words are stored on the device. The programmable logic device switches between configurations sequentially, by random access, or on command from an external or internal signal. This switching is called "flash reconfiguration". Flash reconfiguration allows the PLD to function in one of N configurations, where N is equal to the number of memory cells assigned to each programmable point, or the number of configuration words stored simultaneously on the PLD. Thus, assuming eight configuration words on the PLD, the PLD implements eight times the amount of logic, executable in a time shared fashion, than is actually contained in any one configuration.

It is desirable to extend the flash reconfigurable programmable logic device architecture to general purpose processing structures, such as for use in sequential processing of instructions.

SUMMARY OF THE INVENTION

The present invention is based on applying a flash reconfigurable programmable logic device as a dynamic execution unit for a sequence of instructions. The sequence of instructions includes a control portion, and a portion which indicates which configuration of the flash configurable programmable logic device is to be used with that instruction. In each execution cycle, a configuration is selected in accordance with the instruction being executed, switching from one configuration of the programmable logic device to any other configuration stored on the device in a single cycle.

Thus, the present invention can be characterized as a data processing system which comprises the programmable logic device including configurable logic elements, a configuration store, and configuration select circuits. The configuration store stores a set of configuration words defining respective logic functions of the configurable logic elements in the programmable logic device. The configuration select circuits operate to apply a selected configuration word from the set of configuration words to configure the configurable logic elements. An instruction store stores a sequence of instructions for execution by the programmable logic device. The instructions in the sequence of instructions include a configuration identifier field indicating a selected configuration word in the set of configuration words. Sequencing logic is coupled to the instruction store and the configuration select circuits on the programmable logic device. The sequencing logic causes the configuration select circuits to apply selected configuration words from the configuration store to the configurable logic elements during respective execution cycles, in response to the receipt of the sequence of instructions stored in the instruction store. The flash reconfigurable programmable logic device in this system is able to branch from one configuration to the next in each execution cycle.

In addition, an interrupt based sequencing operation is supported, which in response to an interrupt signal automatically branches the instruction sequence to a pre-set instruction, or in an alternative, automatically causes the programmable logic device to switch to one particular configuration word in the configuration store. In this case, the particular configuration word is defined so that the programmable logic device performs the logic function of responding to the interrupt. In addition, the configurable logic elements include logic in one embodiment, for supplying an interrupt signal which is coupled to the interrupt logic in the sequencing logic that results in applying a pre-specified instruction as an interrupt trap.

According to another aspect of the invention, the data processing system provides for an extended configuration memory storing a plurality of predefined configuration words. This plurality of predefined configuration words may be much greater in number than the set of configuration words stored in the configuration store of the programmable logic device. A configuration store management logic is coupled to the configuration store and to the extended configuration memory. This logic determines whether a selected configuration word for a particular instruction is currently stored in the configuration store, and if not, moves the selected configuration word into the configuration store prior to execution of the particular instruction. The configuration management logic according to one embodiment of the invention comprises a configuration of the programmable logic device itself, defined by a management configuration word stored in the configuration store. Logic is responsive to a determination that the selected configuration word for a particular instruction is not currently stored in the configuration store to cause the configuration selecting logic to apply the management configuration word to configure the configurable logic elements for execution of a function to move the selected configuration word for the particular instruction into the configuration store.

Thus, the configuration memory can be considered analogous to an instruction cache. Instruction fetches and pre-fetches are done to fill the cache as execution proceeds. In this analogy, the address space used for configuration words can be larger than the number of configuration store words stored in the configuration store on the chip. As with current cache or virtual memory architectures, when the desired word is not on the chip, the design loads the word prior to executing the corresponding instruction.

According to yet another aspect of the invention, the configuration store and the extended configuration memory are set-up using a page based caching technique. Thus, the configuration store management logic includes a page table identifying the page of configuration words stored in the configuration store. Match logic is coupled to the sequencing logic and responds to the configuration control field of a particular instruction and to the table for determining whether a selected configuration word for the particular instruction is currently stored in the configuration store. If the match logic does not detect a match, then a new page of configuration words is moved into the configuration store, such that the new page includes the selected configuration word for the particular instruction.

According to yet another aspect of the invention, the programmable logic device is implemented such that configurable logic elements on the device include a sequence control store in communication with the sequencing logic for storing a parameter used for identifying a next instruction in the sequence of instructions, or a control parameter such as used for memory access control or the like in association with instructions being executed. Thus, the sequence control store in various embodiments stores parameters which comprise a next address in the instruction store, a branch address in the instruction store, a branch condition upon which a branch decision can be made during execution of an instruction, or parameters specifying read/write conditions or the like for an external memory coupled with the programmable logic device.

The programmable logic device according to the preferred embodiment of the present invention comprises a field programmable gate array having a configuration store which stores a plurality of configuration words on the order of a 100,000 or more bits long each. The configuration store is implemented using static random access memory cells for fast read and write operations. Alternative systems may implement the configuration store as floating gate memory cells, such as utilized in EPROM based programmable gate arrays, or as dynamic random access memory DRAM cells. In addition, alternative configuration store architectures can be utilized.

Accordingly, the present invention involves adding sequencing control to configuration words so that flash reconfigurable programmable logic devices can be utilized as dynamically reconfigured execution units for data processing systems which execute sequences of instructions. The sequencing control gives powerful control over execution of the instructions, allowing implementation of complex algorithms which take advantage of the dynamic reconfigurability of the programmable logic device.

By extending the flash reconfigurable programmable logic device architecture to a sequential processing engine, a wide variety of new applications for the technology is provided.

Other aspects and advantages of the present invention can be seen upon review of the figures, the detailed description and the claims which follow.

DETAILED DESCRIPTION

Figure 1:
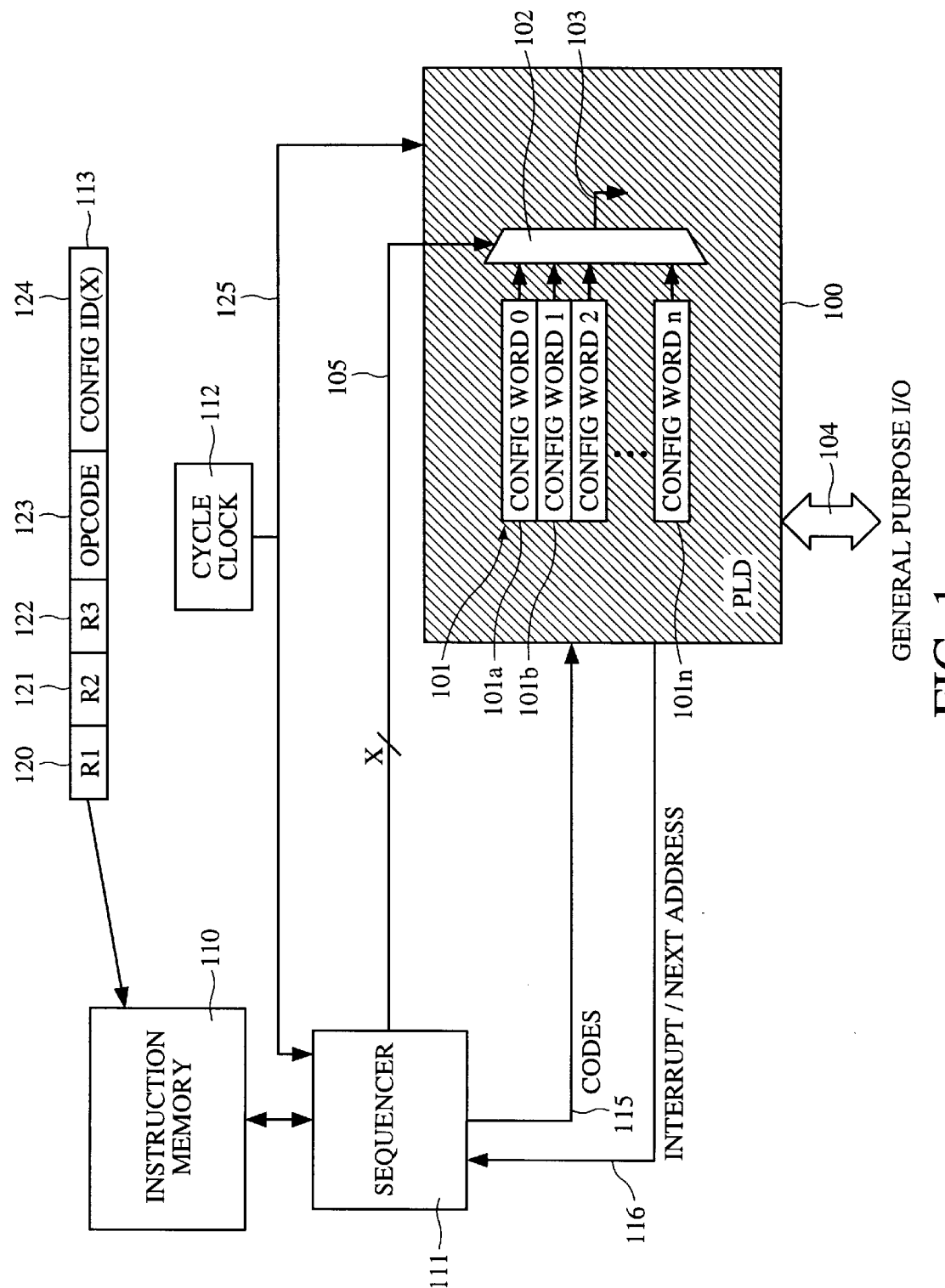
FIG. 1 is a block diagram of the data processing system using a flash reconfigurable programmable logic device according to the present invention.

A detailed description of preferred embodiments of the present invention is provided with respect to FIGS. 1–4, in which FIG. 1 provides a perspective of a data processing system using the flash reconfigurable programmable logic device of the present invention. FIG. 1 illustrates a programmable logic device 100, such as a field programmable gate array FPGA, having a configuration store generally 101, which stores a plurality of configuration words, configuration word 0 through configuration word n. Configuration select logic 102 is coupled to the configuration store 101, which applies a configuration word to the underlying configurable logic elements in the programmable logic device 100 as indicated by line 103.

The programmable logic device 100 of FIG. 1 is based on the characterization of a programmable logic device as having a first plane of configurable logic elements 101a, including for example configurable logic blocks, configurable interconnect structures, and configurable input/output structures, and a second plane of configuration memory 101b included in the configuration store 101, and for example the configuration select logic 102. During execution of a particular process, one of the configuration words is selected for configuring the configurable logic elements of the programmable logic device 100.

As is known in the art, the configurable logic device includes a number of input/output ports utilized as general purpose input/output, as represented by the arrow 104. According to the present invention, the configuration select logic 102 is controlled by a configuration select signal on line 105 which is supplied as input to the programmable logic device. For example, if the configuration store 101 stores eight configuration words, then the configuration select signal on line 105 will consist of three bits for selecting one of eight words during a particular execution cycle.

According to the present invention, an instruction memory 110, a sequencer 111, and a cycle clock 112 are included in the data processing system. The instruction memory 110 stores a sequence of instructions, having a format such as indicated by block 113. The sequencer 111 operates to retrieve individual instructions from the instruction store 110 according to a sequential processing algorithm. Thus, the sequencer generates the configuration select signal 105 for each instruction in the sequence of instructions, and supplies codes on line 115 to the programmable logic device 100 for each instruction. Some of these codes may include immediate data (from the instruction word) and opcodes for the programmable logic device. During each instruction cycle, the programmable logic device 100 supplies on line 116 an interrupt signal, a next address signal or other parameters utilized by the sequencer 111 in sequencing through the instruction memory stored in instruction store 110.

The format of the instructions supplied to the sequencer 111 is illustrated by block 113. In this format, the instruction includes for example three fields 120, 121 and 122 labeled respectively R1, R2 and R3, an opcode 123, and a configuration identifier field 124.

The configuration identifier field 124 is X bits wide and identifies a selected configuration word from the configuration store 101 for a particular instruction. This configuration identifier in field 124 is supplied on line 105 by the sequencer 111 to the configuration select logic 102, in this embodiment of the invention. The parameters R1, R2, R3 (provided from the instruction memory), and the opcode are supplied on line 115 to the programmable logic device 100, for use in execution of the function specified by the selected configuration word.

The cycle clock 112 supplies a clock signal on line 125 which controls the sequencer 111 and manages the timing of the execution of instructions in the programmable logic device 100.

In operation, the sequencer 111 supplies an instruction to the programmable logic device 100 and controls the configuration select logic 102 to apply a selected configuration word for the particular instruction. The parameters R1, R2, and R3, opcode and codes on line 115 are utilized during execution of the function specified by the selected configuration word. A next address, an interrupt signal, or other parameter, is supplied on line 116 as appropriate in response to execution of the function defined by the selected configuration word, and by the codes applied on line 115 for the instruction. The sequencer 111 then applies a next instruction, by incrementing through the addresses of instructions in the instruction store 110, and/or by responding to signals supplied on line 116.

The flash reconfigurable programmable logic device 100 is implemented in one exemplary embodiment as described in our co-pending U.S. Patent Application entitled TIME MULTIPLEXED PROGRAMMABLE LOGIC DEVICE referred to above, which is incorporated by reference as if fully set forth herein.

Figure 2:
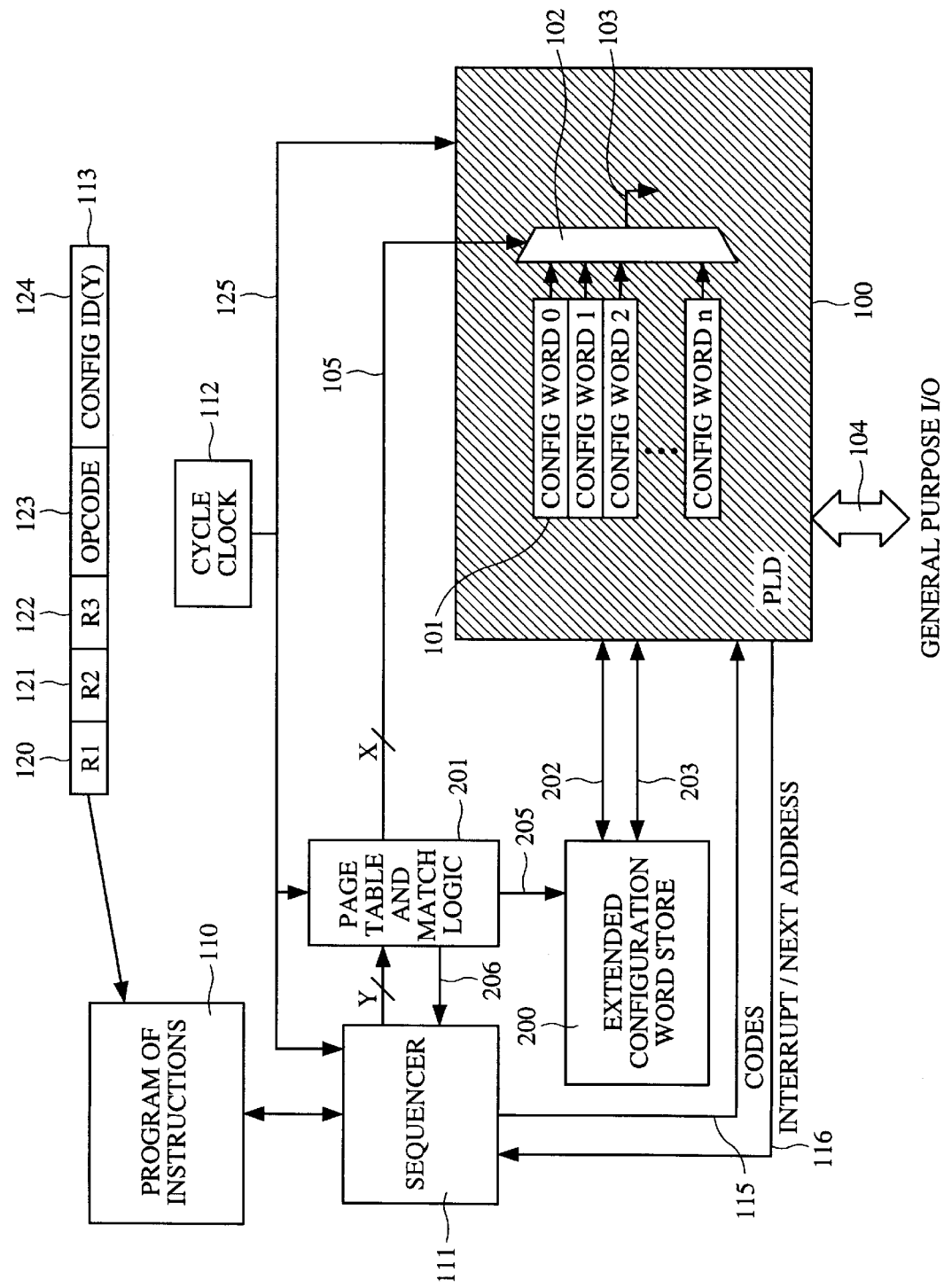
FIG. 2 is a block diagram of an alternative embodiment of a data processing system according to the present invention.

FIG. 2 illustrates an extended version of a data processing system according to the present invention. In FIG. 2, the elements which are found in FIG. 1 are given like reference numbers, and not redescribed. The new elements of FIG. 2 include the extended configuration word store 200, and the page table and match logic 201. The extended configuration word store 200 is coupled to the programmable logic device 100 through a configuration word interface indicated by line 202 and line 203. Control signals for loading and unloading configuration words from the configuration store 101 are transferred across line 202 between the programmable logic device 100 and the extended configuration word store 200. To load or unload a configuration word from the configuration store 101, the data is transferred across the interface indicated by line 203 between the programmable logic device 100 and the extended configuration word store 200. This configuration word interface may be a serial interface, a byte wide interface, or some other conventional extended interface on the programmable logic device as suits the needs of a particular embodiment.

In an extended version, the configuration identifier field 124 in the instruction format represented by block 113 is extended to include a larger number of bits, Y bits in this embodiment, where Y is greater than X and X is the number of bits on line 105 used for selecting a configuration word. Thus, the sequencer 111 applies the Y bit configuration identifier to the page table and match logic 201. The page table stores identifiers of the page or pages of configuration words in the configuration store 101. If the configuration identifier does not match the page of the configuration words already in the configuration store 101, then execution of the instruction is held up while the page of the selected configuration word is moved into the configuration store from the extended configuration word store 200. For example, when a miss is encountered, as indicated by the match logic 201, then the extended configuration word store is signaled across line 205 with the appropriate addresses and control signals to cause the loading of the selected configuration word. Also, the sequencer 111 is signaled as indicated across line 206 to manage the sequencing of instructions so that the selected configuration word is stored in the configuration store 101 prior to execution of the particular instruction. The cycle clock on line 125 is also coupled to the page table and match logic 201, for managing the logic functions executed for processing instructions. For example, there may be thirty-two predefined configuration words stored in the configuration word store 200, while the configuration store 101 on the programmable logic device stores eight words. Thus, the number of Y bits in the configuration identifier would be five bits to specify one of thirty-two configuration words. The two high order bits of the five bit identifier are used to specify the page in the extended configuration word store 200 in which the selected configuration word resides.

Thus, configuration store management logic, such as the page table and match logic 201 and extended configuration word store 200 of FIG. 2, is added to the system to increase the flexibility of the instruction memory 110 being executed by the data processing system. The configuration store management can take on a wide variety of techniques, in addition to the page table technique described above. For example, predictive or look ahead caching of configuration words can be used, virtual memory techniques can be used, or other memory management processes implemented to efficiently manage the configuration words stored in the configuration store 101 of the programmable logic device so that the processing of the sequence of instructions is maintained with as few delays as possible for the purposes of accommodating loading and unloading of configuration words from the configuration store 101.

In the preferred embodiment, as mentioned above, the configuration store 101 is implemented using SRAM style memory elements which are very fast and dynamically accessible for the purposes of loading and unloading configuration words. Alternative systems, particularly if using the architecture of FIG. 1, include a configuration store 101 implemented using EPROM or other non-volatile, floating gate transistor based memory elements, or using dynamic random access memory DRAM cells or other small, dense memory elements.

For performance reasons, the page table and match logic 201, are preferably implemented on a single integrated circuit with the programmable logic device 100.

Figure 3:
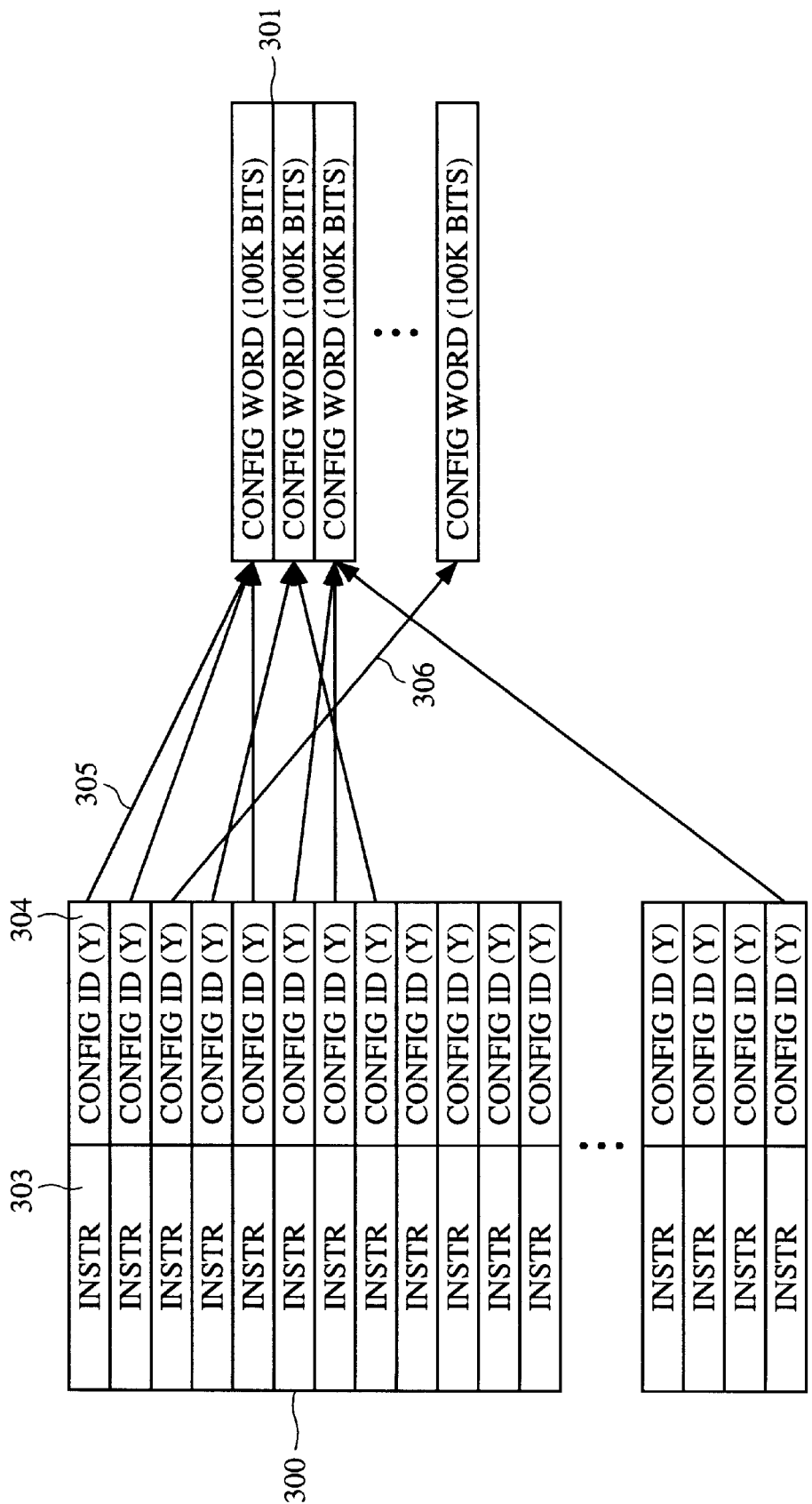
FIG. 3 is a diagram illustrating the instruction sequencing utilized according to the preferred embodiment of the present invention.

FIG. 3 is a diagram illustrating a instruction memory 300, and the relationship of the instruction memory to configuration words 301. The program of instructions 300 includes a sequence of instructions, wherein each instruction includes an instruction field 303 and a configuration identifier field 304. The configuration identifier comprises a pointer to one of a plurality of predefined configuration words 301. Thus, the first instruction in the example shown in FIG. 3 points to the first configuration word as indicated by arrow 305. The second instruction in the example shown in FIG. 3 also points to the first configuration word. The third instruction in the sequence of FIG. 3 points to the last configuration word as indicated by arrow 306, and so on, such that the configuration word selected for a particular instruction in a sequence of instructions dynamically changes in a user defined manner. In this manner, a large number of possible instructions are implemented based on a smaller number of configurations. Furthermore, the sequence of instructions comprise a much smaller number of bits per instruction, than the configuration words themselves. In the one exemplary embodiment, such as that described in the cross referenced U.S. Patent Application entitled TIME MULTIPLEXED PROGRAMMABLE LOGIC DEVICE, the configuration words are greater than 100,000 bits each, for example about 170,000 bits.

The instruction field 303 of each instruction can be implemented such as illustrated in FIGS. 1 and 2 with the fields R1, R2, R3 and an opcode field. Additional fields can be utilized for controlling address sequencing, or providing other control (i.e. parameters R1, R2, and R3) over the function being executed during a particular execution cycle. Possible fields in the control part of the instruction include the following:

Next Address Field:

A next address field can be included in the instruction which identifies the next configuration word to be executed in the sequence, or a next instruction in the instruction memory to be executed in the sequence. The next address field, when used to identify the next configuration word, may be more than log(n) bits, where n is the number of memory words in the configuration store. In this case, references to configuration words that are not in the configuration store may be trapped, and they may be transferred from the extended configuration word memory into the programmable logic device in time for execution of the next instruction.

Alternatively, the next address field can be used for a next instruction in the sequence of instructions, such as by storing an offset address in the instruction to provide relative addressing or the like. As mentioned above, as an alternative to the next address field in the instruction, the next address may be specified by the logic function being executed in the programmable logic device during a particular execution cycle.

Branch Address Field:

A branch address field can be included in the instruction which specifies the next configuration word, or a next instruction in the instruction memory, to be executed if a branch condition evaluates to be true. This branch address field can be implemented in a manner similar to the next address field discussed above.

Branch Conditional:

A branch conditional field identifies a condition by which the programmable logic device selects a next address or branch address. Thus, a branch conditional field could identify options such as the following:

1) Unconditional branch, which requires the next address field to always be utilized.
2) Branch in response to a signal produced by the programmable logic device wired to a branch condition block in the sequencer.
3) Branch condition is based on a signal on a pin on the programmable logic device. The branch can be conditioned on a combination of internal and external signals which allows internal and external logic to be synchronized.
4) A counter branch can be conditioned on a counter in the sequencer reaching a predefined value for looping and the like.
5) Branch can be conditioned on a subroutine jump, such that a current address is saved and control passes to the address indicated in the branch conditional parameters.
6) A subroutine return can be indicated by the branch conditional field. In response to this field control continues from an address stored in a subroutine stack register upon execution of a subroutine jump.
7) A branch conditional field can specify an interrupt return parameter such that control continues from an address saved in the interrupt return register in the sequencer.

Instruction Duration Field:

Each instruction may include a parameter which defines the time needed to execute an instruction according to the selected configuration word. Utilizing this type of control field, fixed execution lengths for instructions are not required. Rather, the instruction length is specified by a control field giving the number of nano-cycles required for execution of instruction, where a nano-cycle is a cycle of a high speed internal clock in the cycle clock 112. In this case, the instruction control field contains a count of the number of nano-cycles for the execution cycle of the particular instruction. Alternatively, instruction lengths may come in a few pre-selected sizes, and the instruction duration control field may be a code specifying a particular one of the pre-selected sizes.

Also the, instruction duration control field may specify self-timed mode, such that the sequencer is responsive to a "ready" connection produced by the programmable logic device upon completion of execution of the cycle. Alternatively, the instruction duration field may specify an operation by which the cycle clock is controlled by external parameters.

Interrupt Enable Field:

If the sequencer includes the ability to interrupt a current evaluation at the end of a micro-cycle and proceed to another address, each instruction may include an interrupt enable field which enables the interrupt process. A new address may be predefined, or provided on the pins of the programmable logic device, or provided as signals in the core of the array. The current instruction address is saved in response to the interrupt in a hidden register. This register may be read by the programmable logic device or may be available on the input/output pins. The sequencer may contain a stack of interrupt/subroutine addresses for supporting this process.

Return After Instruction Field:

An instruction may include a field which causes the programmable logic device to pop the last address off a subroutine stack and continue execution at that point.

Memory Operation OffSet Field:

A memory operation offset field provides an offset for the programmable logic device originated memory operations. Alternatively this may be a register accessible on the programmable logic device rather than a control field in the instruction.

Memory Data Field:

A memory data field may be provided for immediate data used in execution of the instruction.

Memory Mode Field:

A memory mode field may set a mode for memory access for use during execution of an instruction, such as immediate, direct, offset or some other method.

Figure 4:
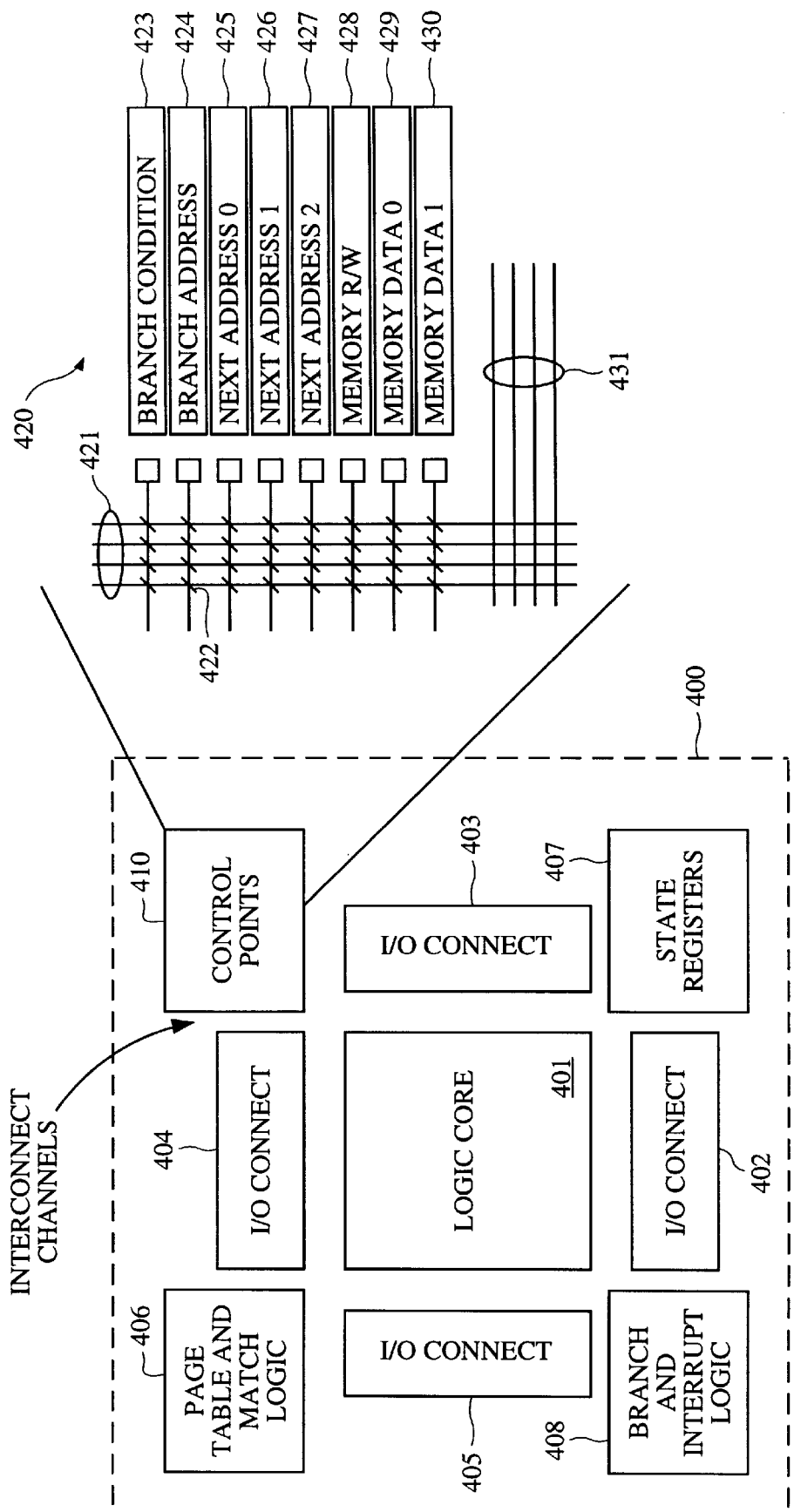
FIG. 4 is a diagram of enhancements for a programmable logic device architecture for use with the sequential instruction processing of the present invention.

FIG. 4 illustrates the logic elements implemented on one embodiment of a programmable logic device 400 for the purpose of sequential processing of instructions according to the present invention. In this embodiment, the programmable logic device 400 includes a logic core 401, and input/output connect structures 402, 403, 404 and 405, implemented as discussed in the cross referenced U.S. Patent Application entitled TIME MULTIPLEXED PROGRAMMABLE LOGIC DEVICE. In addition, the configuration word page table and match logic 406 is implemented on the chip. State registers 407 utilized by the sequencing logic are also provided on the chip. Furthermore, branch and interrupt logic 408 is implemented on the chip. The page table and match logic 406, the state registers 407, and the branch and interrupt logic 408 may be dedicated circuitry on the programmable logic device 400, or produced by configuration of the logic core and I/O connect structures themselves as part of the configuration words. Performance requirements of these particular applications of the invention will dictate the choice of implementation.

The state registers 407 can be used during swap operations, such as in response to an interrupt or the like, such that the state of execution of a particular configuration word can be stored in the state registers 407, while an interrupt trap is executed. Upon completion of the trap, the state registers 407 can be used for the purpose of recovering the state of the execution of the sequence of instructions and continuing from that point. Alternatively, the state registers 407 can be used for a variety of processes necessary for instruction sequencing in complex sequences of instructions.

In addition, the present invention may be extended by providing on chip control points as represented by block 410. The on chip control points 410 are coupled to the interconnect lines, as shown in the "blow up", generally 420, of the on chip control points 410 in FIG. 4. The vertical lines 421 and horizontal lines 431 depict interconnect lines on the programmable logic device 400. The diagonal marks (e.g. 422) denote optional connections on the programmable logic device 400 to route signals on that interconnect to the chip control points 410. Thus, the interconnect structure includes a plurality of buses 421, with programmable interconnect points, such as point 422 coupled to respective control points 423–430. In one embodiment, the control points 423–430 are registers storing parameters utilized in the sequencing of instructions according to the present invention, or utilized for memory management during execution of the instructions in the embodiment illustrated. For example, in this embodiment, the control point 423 stores a branch condition parameter, the control point 424 stores a branch address, the control points 425–427 store next address values, and the control points 428–430 store memory parameters, such as memory read/write control signals, or actual memory data. The on chip control points 410 may be used as alternatives to control fields in the instructions in the sequence of instructions, or may be used in addition to or as optional choices with such control fields.

Accordingly, the present invention provides a unique application of flash reconfigurable programmable logic devices, and extensions of such devices for the purposes of executing a sequence of instructions in which the configuration of the programmable logic device is carried as a portion of the instruction.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A data processing system, comprising:

a programmable logic device including configurable logic elements, a configuration store, and configuration select logic all located within the programmable logic device, the configuration store storing a set of configuration words defining respective logic functions of the configurable logic elements in the programmable logic device, and the configuration select logic operating to apply a selected configuration word from the set of configuration words to configure the configurable logic elements;

an instruction store for storing a sequence of instructions for execution by the programmble logic device, the instructions including a configuration identifier field indicating a selected configuration word in the set of configuration words, each of the identifier fields in the sequence including fewer bits than the number of bits of the selected configuration word; and logic coupled with the instruction store and the configuration select logic the sequencing logic causing the configuration select logic to apply to the configurable logic elements, during respective execution cycles and in response to the receipt of the sequence of instructions stored in the instruction store, selected configuration words from the configuration store as identified by the instructions.

2. The data processing system of claim 1, wherein instructions in the sequence of instructions include a configuration identifier field indicating a selected configuration word from a plurality of predefined configuration words; and including:

extended configuration memory storing a plurality of predefined configuration words; and configuration store management logic, coupled to the configuration store and to the extended configuration memory, which determines whether the selected configuration word for a particular instruction is currently stored in the configuration store, and if not, moves the selected configuration word into the configuration store prior to execution of the particular instruction.

3. The data processing system of claim 2, wherein the configuration store management logic comprises a configuration of the programmable logic device defined by a management configuration word in the set of configuration words, and logic responsive to a determination that the selected configuration word for the particular instruction is not currently stored in the configuration store to cause the sequencing logic to apply the management configuration word to configure the configurable logic elements for execution of a function for moving the selected configuration word for the particular instruction into the configuration store.

4. The data processing system of claim 2, wherein the configuration store management logic includes a table identifying configuration words in the set of configuration words in the configuration store, and match logic responsive to the configuration identifier field of the particular instruction and the table for determining whether the selected configuration word of the particular instruction is currently stored in the configuration store.

5. The data processing system of claim 4, wherein the programmable logic device, the table and the match logic are implemented on a single integrated circuit.

6. The data processing system of claim 1, wherein the programmable logic device includes a sequence control store in communication with the sequencing logic for storing a parameter used for identifying a next instruction in the sequence of instructions.

7. The data processing system of claim 6, wherein said parameter comprises a next address in the instruction store.

8. The data processing system of claim 6, wherein said parameter comprises a branch address for the instruction store.

9. The data processing system of claim 6, wherein said parameter comprises a branch condition.

10. The data processing system of claim 1, wherein the programmable logic device includes a sequence control store in communication with the sequencing logic for storing a parameter used for memory access control.

11. The data processing system of claim 1, wherein said configuration words each comprise greater than 100,000 bits.

12. The data processing system of claim 1, wherein the seguencing logic includes interrupt logic responsive to an interrupt signal to apply a pre-specified instruction, and the configurable logic elements include logic for supplying the interrupt signal.

13. The data processing system of claim 1, wherein the sequencing logic includes interrupt logic responsive to an interrupt signal to cause the configuration select logic to apply a particular configuration word, and the configurable logic elements include logic or supplying the interrupt signal.

14. The data processing system of claim 1, wherein the configuration store comprises static random access memory cells.

15. The data processing system of claim 1, wherein the configuration store comprises floating gate memory cells.

16. The data processing system of claim 1, wherein the configuration store comprises dynamic random access memory cells.

17. A data processing system of claim 1, wherein instructions in the sequence of instruction include a configuration identifier field indicating a selected configuration word from a plurality of predefined configuration words; and including:
    extended configuration memory storing a plurality of predefined configuration words; and
    configuration store management logic coupled to the configuration store and to the extended configuration memory, the configuration store management logic determining whether the selected configuration word for a particular instruction is currently stored in the configuration store, and, if not, moving the selected configuration word from the extended configuration memory into the configuration store prior to execution of the particular instruction, the configuration store management logic including a table identifying configuration words in the set of configuration words in the configuration store, and match logic responsive to the configuration identifier field of the particular instruction and to the table for determining whether the selected configuration word of the particular instruction is currently stored in the configuration store.

18. The data processing system of claim 17, wherein the programmable logic device, the table and the match logic are implemented on a single integrated circuit.

19. The data processing system of claim 17, wherein the programmable logic device includes a sequence control store in communication with the sequencing logic for storing a parameter used for identifying a next instruction in the sequence of instructions.

20. The data processing system of claim 19, wherein said parameter comprises a next address in the instruction store.

21. The data processing system of claim 19, wherein said parameter comprises a branch address for the instruction store.

22. The data processing system of claim 19, wherein said parameter comprises a branch condition.

23. The data processing system of claim 17, wherein the programmable logic device includes a sequence control store in communication with the sequencing logic for storing a parameter used for memory access control.

24. The data processing system of claim 17, wherein said configuration words each comprise greater than 100,000 bits.

25. The data processing system of claim 17, wherein the sequencing logic includes interrupt logic responsive to an interrupt signal to apply a pre-specified instruction, and the configurable logic elements include logic for supplying the interrupt signal.

26. The data processing system of claim 17, wherein the sequencing logic includes interrupt logic responsive to an interrupt signal to cause the configuration select logic to apply a particular configuration word, and the configurable logic elements include logic for supplying the interrupt signal.

27. A data processing system as recited in claim 8, wherein the programmable logic device is a field programmable gate array (FPGA), the configurable logic elements are configurable logic blocks within the FPGA, the configuration store and the configuration select logic are within the FPGA, and the instruction store, the sequencing logic, the extended configuration memory, and the configuration store management logic are all external to the FPGA.

28. A data processing system as recited in claim 1, wherein the programmable logic device is a field programmable gate array (FPGA), the configurable logic elements are configurable logic blocks within the FPGA, the configuration store and the configuration select logic are within the FPGA, and the instruction store and the sequencing logic are external to the FPGA.

29. The data processing system of claim 1, further comprising:

an extended configuration memory for storing a plurality of predefined configuration words; and configuration store management logic, coupled to the configuration store and to the extended configuration memory, for determining whether the selected configuration word for a particular instruction is currently stored in the configuration store and, if not, moving the selected configuration word into the configuration store prior to execution of the particular instruction.

* * * * *